(12) United States Patent
Malkoč et al.

(10) Patent No.: US 12,152,906 B2
(45) Date of Patent: *Nov. 26, 2024

(54) SURVEYING INSTRUMENT

(71) Applicant: LEICA GEOSYSTEMS AG, Heerbrugg (CH)

(72) Inventors: Elvir Malkoč, Widnau (CH); Josef Müller, Oberegg (CH); Johannes Hotz, Rebstein (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 315 days.

This patent is subject to a terminal disclaimer.

(21) Appl. No.: 17/857,961

(22) Filed: Jul. 5, 2022

(65) Prior Publication Data

US 2022/0404146 A1  Dec. 22, 2022

Related U.S. Application Data

(63) Continuation of application No. 17/010,659, filed on Sep. 2, 2020, now Pat. No. 11,703,325.

(30) Foreign Application Priority Data

Sep. 2, 2019 (EP) .................................... 19194963

(51) Int. Cl.
*G01C 3/02* (2006.01)
*G01B 21/22* (2006.01)
(Continued)

(52) U.S. Cl.
CPC .............. *G01C 3/02* (2013.01); *G01B 21/22* (2013.01); *G01C 11/00* (2013.01); *G01C 15/002* (2013.01); *G01P 13/00* (2013.01)

(58) Field of Classification Search
None
See application file for complete search history.

(56) References Cited

U.S. PATENT DOCUMENTS

| 2010/0245587 A1* | 9/2010 | Otani | G06T 7/277 |
| | | | 348/169 |
| 2017/0236299 A1 | 8/2017 | Valkenburg | |

(Continued)

FOREIGN PATENT DOCUMENTS

| CN | 101932906 A | 12/2010 |
| CN | 107560594 A | 1/2018 |

(Continued)

OTHER PUBLICATIONS

European Search Report dated Mar. 13, 2020 as received in application No. 19194963.5.

*Primary Examiner* — Luke D Ratcliffe
(74) *Attorney, Agent, or Firm* — Maschoff Brennan

(57) ABSTRACT

A surveying instrument for executing a relocation functionality, which determines first coordinates of a stationary target point associated with the start signal, in response to a start signal, a first actuator and a second actuator are controlled such that the stationary target point remains within a detection area of a tracking unit of the surveying instrument, determines second coordinates of the stationary target point, receives an end signal, wherein the second coordinates of the stationary target point are associated with the end signal, and based at least in part on the first and second coordinates of the stationary target point, and determines a relative pose of the surveying instrument with respect to a first setup location and a second setup location, wherein the first setup location is associated with the first coordinates and the second setup location is associated with the second coordinate.

15 Claims, 3 Drawing Sheets

(51) Int. Cl.
*G01C 11/00* (2006.01)
*G01C 15/00* (2006.01)
*G01P 13/00* (2006.01)

(56) References Cited

U.S. PATENT DOCUMENTS

2018/0003439 A9 1/2018 Thomas
2018/0158200 A1 6/2018 Metzler
2020/0363202 A1* 11/2020 Metzler .................... G06T 7/80

FOREIGN PATENT DOCUMENTS

EP 2237071 B1 7/2016
WO 2009/100773 8/2009

* cited by examiner

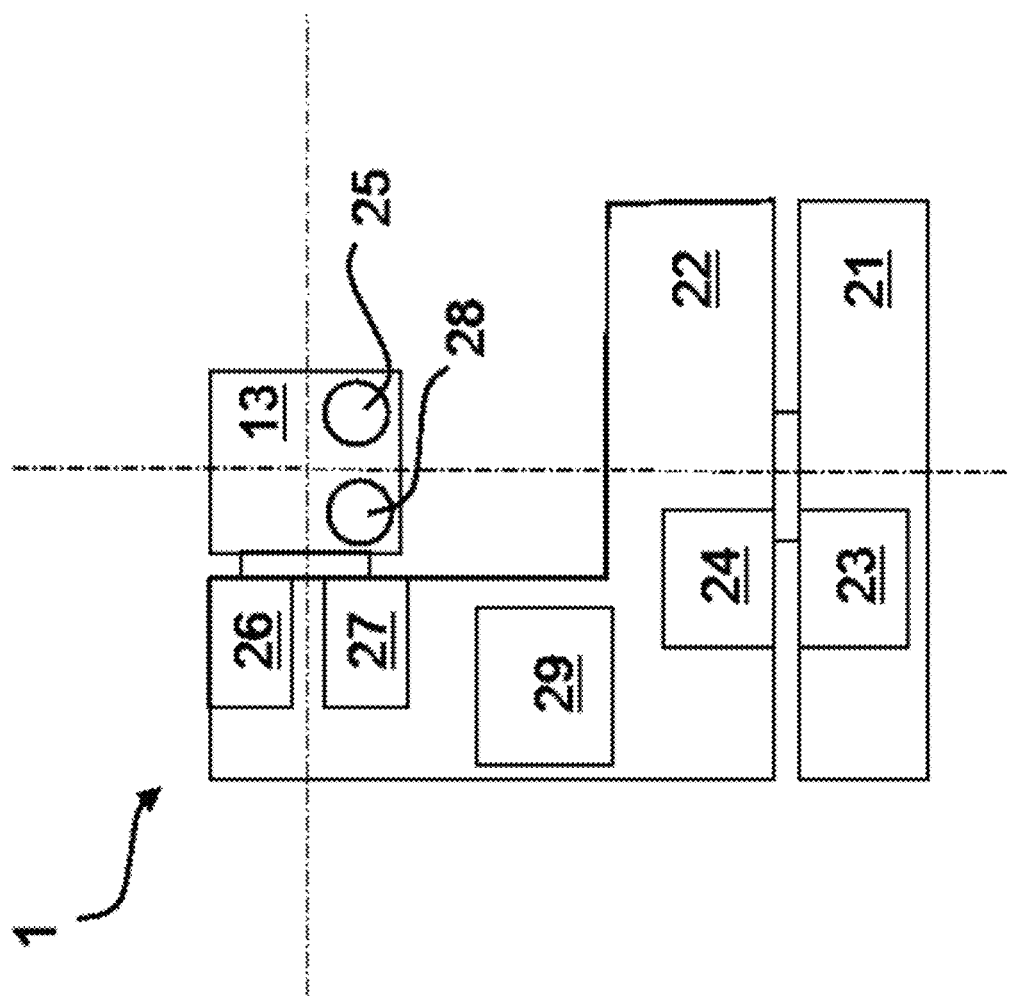

SURVEYING INSTRUMENT

FIELD OF THE INVENTION

The present invention relates to a surveying instrument and a method of relocating a surveying instrument. Generic surveying instruments are e.g. total stations, tachymeters, theodolites, or laser trackers and pertain to the art of geodesy and/or metrology.

BACKGROUND OF THE INVENTION

In common measuring or stake-out procedures, a surveyor aims with a measuring instrument at a target or a target point of a setting to be measured and then precisely measures the position of the target or target point. Widely used targets are prisms, reflectors, tapes, and target plates, wherein such targets usually represent stationary target points of the environment such as room corners, window corners, wall sockets, water pipes, or any other significant geometric features. However, generic surveying instruments are also designed to directly survey such points in the environment. Manually aiming at the targets or target points is made easier with a telescope, or an electronic viewfinder.

A procedure often necessary to survey a large and/or winding room or a complex setting is to combine points that have been measured from different setup locations. When changing the setup location, it is required to correlate the different setup locations in order to have all the measured points in the same coordinate system. In other words, a relative pose of the surveying instrument (or to be precise: of the inner reference system of the surveying instrument) in the different setup locations need to be determined.

To accomplish this, a mostly manual and tedious process which needs quite a lot skill and experience is carried out. At least three points that were measured from the former setup location need to be found back from the current setup location and then measured again. Also, it needs to be input over a graphical user interface which measured point correlates to which of the formerly measured points.

OBJECT OF THE INVENTION

Therefore, the invention provides an improved surveying instrument. A surveying instrument according to the invention allows for a more ergonomic, more reliable, and more productive surveying process which involves a relocation.

SUMMARY OF THE INVENTION

The invention relates to a surveying instrument comprising a base unit, a support unit mounted on the base unit and configured for being rotatable relative to the base unit around a yaw axis, a first actuator configured for rotating the support unit relative to the base unit around the yaw axis, a first angle encoder configured for measuring a rotatory position of the support unit relative to the base unit around the yaw axis, a targeting unit comprising a distance meter having a measuring axis, the targeting unit being mounted on the support unit and configured for being rotatable relative to the support unit around a pitch axis, a second actuator configured for rotating the targeting unit relative to the support unit around the pitch axis, a second angle encoder configured for measuring a rotatory position of the targeting unit relative to the support unit around the pitch axis, a tracking unit configured for detecting one or more target points within a detection range, wherein the measuring axis converges with or extends entirely within the detection range, a control unit configured for reading the distance meter, the first angle encoder, the second angle encoder, and the tracking unit, controlling the first actuator and the second actuator, and executing a relocation functionality, wherein the surveying instrument is, when the relocation functionality is executed, configured for determining first coordinates of a first stationary target point, receiving a start signal, wherein the first coordinates of the first stationary target point are associated with the start signal, in response to the start signal, controlling the first actuator and the second actuator in such a way that the first stationary target point remains within the detection range, determining second coordinates of the first stationary target point, receiving an end signal, wherein the second coordinates of the first stationary target point are associated with the end signal, and based at least in part on the first and second coordinates of the first stationary target point, determining a relative pose of the surveying instrument with respect to a first setup location and a second setup location, wherein the first setup location is associated with the first coordinates and the second setup location is associated with the second coordinates.

Specifically, and partly with other words, the surveying instrument may pertain to the art of geodesy and be embodied as total station. The surveying instrument comprises a base unit, a support unit mounted on the base unit and configured for being rotatable relative to the base unit around a yaw axis, and a targeting unit comprising a distance meter having a measuring axis. The targeting unit is mounted on the support unit and configured for being rotatable relative to the support unit around a pitch axis.

The surveying instrument further comprises a first actuator configured for rotating the support unit relative to the base unit around the yaw axis, and a first angle encoder configured for measuring a rotatory position of the support unit relative to the base unit around the yaw axis. As well, the surveying instrument comprises a second actuator configured for rotating the targeting unit relative to the support unit around the pitch axis, and a second angle encoder configured for measuring a rotatory position of the targeting unit relative to the support unit around the pitch axis.

Furthermore, the surveying instrument comprises a tracking unit and a control unit. The tracking unit comprises a camera sensor and is configured for detecting one or more points/features in an environment within a detection range. The control unit is configured for reading the distance meter, the first angle encoder, the second angle encoder, and the tracking unit. The control unit is also configured for controlling the first actuator and the second actuator, and for executing the inventive relocation functionality.

Therein, the control unit may be configured for executing the relocation functionality according to the present invention such that the surveying instrument is, when the relocation functionality is executed, configured for performing the following steps:
- detecting at least three stationary points in the environment and keeping track of them during travel of the surveying instrument from a first setup location to a second setup location, based on image data from the camera sensor, and
- when arrived at the second setup location:
- choosing at least two known target points by the control unit automatically based on the scene available from the first setup location and based on the step of keeping track of the at least three stationary points, measuring the positions of the at least two known target points automatically or semi-automatically, wherein coordinates of the at least two known target points are determined based on readings of the distance meter, the first angle encoder and the second angle encoder, and based at least in part on the determined coordinates of the at least two known target points, determining a relative pose of the surveying instrument in the second setup location with respect to the first setup location.

As explained further below with reference to the figures, the image-based tracking of the stationary points/features of the environment (in particular including performing a Simultaneous Localisation and Mapping (SLAM) process) during travel of the surveying instrument may only lead to a relatively rough accuracy for determining the delta pose between the first setup location and the second setup location. However, when the surveying instrument is finally setup at the second setup location, the relatively rough accuracy will be enough to roughly know where to seek for the known target points. The total station can use the relatively rough accuracy in order to automatically measure the accurate positions of the at least known target points, which then allows for precisely determining the pose of the second setup location relative to the first setup location.

Therein, the at least two known target points may be target points that have been previously measured by the total station from the first setup location, wherein coordinates of the at least two known target points are determined based on readings of the distance meter, the first angle encoder and the second angle encoder.

The control unit may be further being configured for executing the relocation functionality such that:
  a start signal is received indicative for the surveying instrument being in the first setup location and being about to be moved from the first setup location to a second setup location,
  an end signal is received indicative for the surveying instrument having arrived at the second setup location.

The surveying instrument may further comprise a user interface configured for receiving a user input, wherein at least one of the start signal and the end signal is/are based on a respective user input received by the user interface. Additionally or alternatively to the user interface, the surveying instrument may comprise an inertial measuring unit (IMU) configured for detecting a standstill and a movement of the surveying instrument, wherein the control unit is configured for reading the IMU and for generating the start signal based on a detected movement and/or the end signal based on a detected standstill.

The surveying instrument may further comprise an inertial measuring unit (IMU) configured for generating IMU data between receiving the start signal and the end signal, wherein the control unit is configured for distinguishing between a translation and a rotation of the surveying instrument based on the IMU data.

In case the relocation functionality includes controlling of the first actuator and the second actuator, the surveying instrument may be configured for controlling the first actuator and the second actuator in such a way that the first stationary target point remains in a tolerance range around the measuring axis, in particular on the measuring axis.

In particular, the start signal is indicative for the surveying instrument having taken the first setup location, and the end signal is indicative for the surveying instrument having taken the second setup location.

In an embodiment, the camera sensor may have a first field of view, the first field of view being comprised by the detection range, in particular wherein controlling the first actuator and the second actuator between receiving the start signal and the end signal is based on a detection of the first stationary target point by the camera sensor.

In a further embodiment, the tracking unit comprising the camera sensor is configured for detecting random features of an environment, and wherein the control unit is configured for performing a Simultaneous Localisation and Mapping (SLAM) process based on detected random features of the environment.

The tracking unit may be configured for simultaneously detecting a second and a third stationary target point, and wherein determining the relative pose is further based on (a) known coordinates of the second and third stationary target points determined by the surveying instrument from the first setup location, and (b) a detection of the second and third stationary target points between receiving the start signal and the end signal.

The tracking unit may further comprise (a) a light emitter configured for emitting light with a characteristic wavelength and (b) a target search sensor configured for detecting only light having the characteristic wavelength, the target search sensor having a second field of view, the second field of view being comprised by the detection range, in particular wherein controlling the first actuator and the second actuator between receiving the start signal and the end signal is based on a detection of the first stationary target point by the target search sensor.

The invention may also relate to a method of relocating a surveying instrument from a first setup location to a second setup location, the method comprising:
  providing a surveying instrument according to any of the preceding claims, setting up the surveying instrument at a first setup location,
  at the first setup location, determining with the surveying instrument first coordinates of a first, a second, and of a third stationary target point,
  at the first setup location, receiving with the control unit a start signal, wherein the first coordinates of the first stationary target point are associated with the start signal,
  in response to the start signal, controlling with the control unit the first actuator and the second actuator in such a way that the first stationary target point remains within the detection range of the tracking unit,
  while controlling the first and second actuator, moving the surveying instrument from the first setup location to a second setup location, at the second setup location, determining with the surveying instrument
  second coordinates of the first stationary target point,
  at the second setup location, receiving with the surveying instrument an end signal, wherein the second coordinates of the first stationary target point are associated with the end signal,
  in response to the end signal, determining with the surveying instrument at the second setup location second coordinates of the second and third stationary target points, and
  based on the determined first and second coordinates of the first, second, and third stationary target point, determining with the control unit a relative pose of the surveying instrument with respect to the first setup location and a second setup location.

The method may further comprise: generating the start signal based on a movement detected by an inertial measuring unit (IMU) comprised by the surveying instrument.

Also, the method may comprise: generating the end signal based on a standstill detected by an/the inertial measuring unit (IMU) comprised by the surveying instrument.

In an embodiment, the controlling of the first actuator and of the second actuator is performed in such a way that the first stationary target point remains in a tolerance range around the measuring axis, in particular on the measuring axis.

The method may also comprise: while moving the surveying instrument from the first setup location to the second setup location, simultaneously detecting the first, second, and third stationary target points with the tracking unit, wherein the determining of the second and third stationary target points is performed automatically based on controlling with the control unit the first actuator and the second actuator in such a way that the measuring axis aims at the respective stationary target point.

In yet another embodiment, the controlling of the first actuator and of the second actuator between receiving the start signal and the end signal is based on a detection of the first stationary target point by a camera sensor and/or by a target search sensor of the surveying instrument, in particular additionally based on a detection of the second and third stationary target point by the camera sensor and/or by the target search sensor.

BRIEF DESCRIPTION OF THE DRAWINGS

By way of example only, preferred embodiments of the invention will be described more fully hereinafter with reference to the accompanying figures, wherein:

FIG. 6 shows components of a surveying system.

DETAILED DESCRIPTION OF THE DRAWINGS

Figure 1:
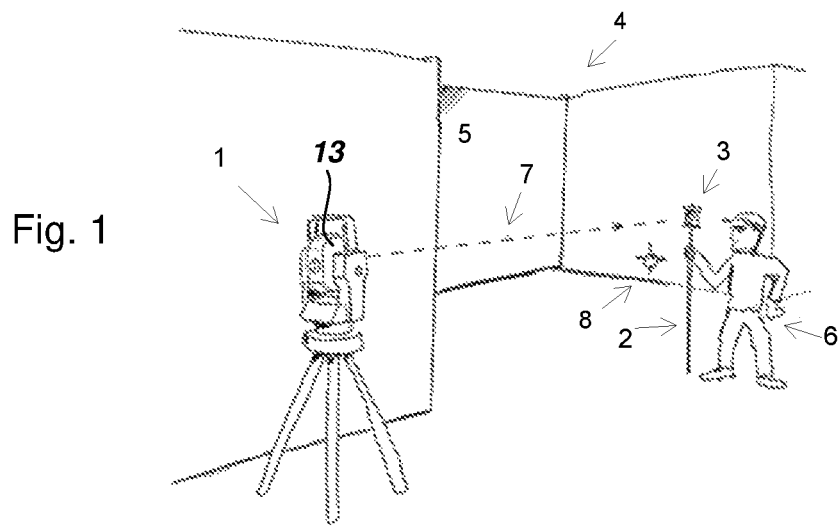
FIG. 1 shows a surveyor using a total station and a surveying pole for surveying a room.

FIG. 1 shows a total station 1 as an exemplary surveying instrument tracking a movable target in an environment 4, in this example a surveying pole 2 with a retro-reflector 3 mounted on its head. The surveying instrument 1 comprises a base unit 21, a support unit 22 mounted on the base unit 21 and configured for being rotatable relative to the base unit 21 around a yaw axis, and a targeting unit 13 comprising a distance meter having a measuring axis 7, the targeting unit 13 being mounted on the support unit 22 and configured for being rotatable relative to the support unit 22 around a pitch axis. The surveyor 6 can point with a pointing tip of the surveying pole 2 at any target point he wants to measure. The total station 1 is in this example equipped with a tracking unit which can follow the retro-reflector with light sent through the measuring axis 7. The measuring axis 7 is the axis of a distance meter arranged in the targeting unit. The tracking unit has a detection range that can surround the measuring axis or intersect with the measuring axis such that a usually distanced target aimed at with the measuring axis is detectable by the tracking unit.

In the shown embodiment, the tracking unit comprises a target search system which is integrated in the surveying instrument and comprises a target search sensor and a light emitter designed for emitting a light with a characteristic wavelength. The target search sensor has a field of view (FOV) that is comprised by the detection range. If the tracking unit comprises only the target search system, the FOV of the target search sensor is the detection range. The target search sensor is sensitive only or essentially only for this characteristic target search light. The target search sensor can be integrated in the targeting unit (where also a telescope is arranged), wherein the target search sensor may use the optical axis of the telescope (on-axis) and therefore in this case has a rather narrow detection range, i.e. usually less than 45°. In this case, the measuring axis 7 coincides or essentially coincides with the optical axis of the telescope and the target search sensor. However, a target search sensor outside the telescope (i.e. arranged in a different component) and/or off-axis to the measuring axis 7 could be used as well, as long as its detection range covers the measuring axis 7 in its usual target range.

Said telescope is optional in a surveying instrument according to the invention. Telescopes are usually provided in total stations. However, if the surveying instrument is e.g. a laser tracker, such a telescope might not be provided.

In known surveying instruments, such a target search system has a configuration for prompting the targeting unit 13 of the surveying instrument to pivot horizontally and/or vertically in order to let the measuring axis aim at where a target is detected, which is called "tracking". Depending on the location of the reflection of the characteristic light within the target search sensor, the targeting unit 13 is pivoted to point the measuring axis (distance meter beam) onto the target. This procedure is continuously repeated in order to track the movement of the target (wherein the surveying instrument is stationary). However, according to the invention, it is the target or target point which is stationary and the surveying instrument is moved in context of a relocation.

Figure 2:
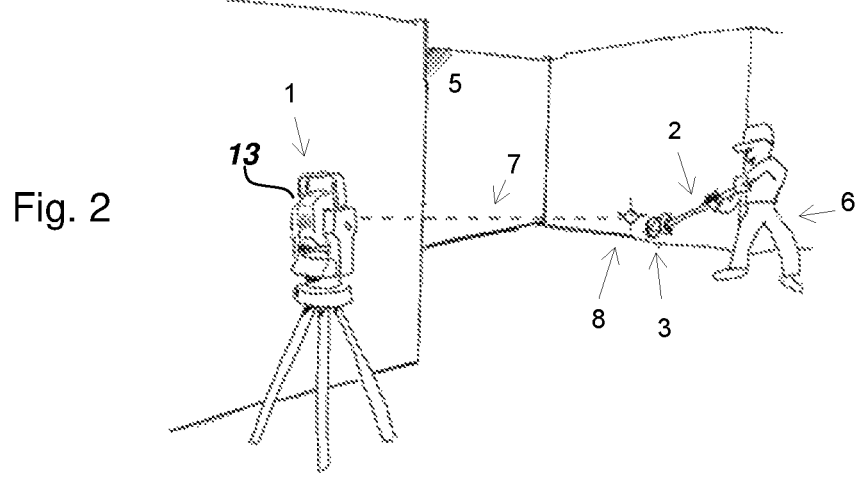
FIG. 2 shows the surveyor from FIG. 1 guiding the total station towards a stationary target point in preparation of a relocation.
Figure 3:
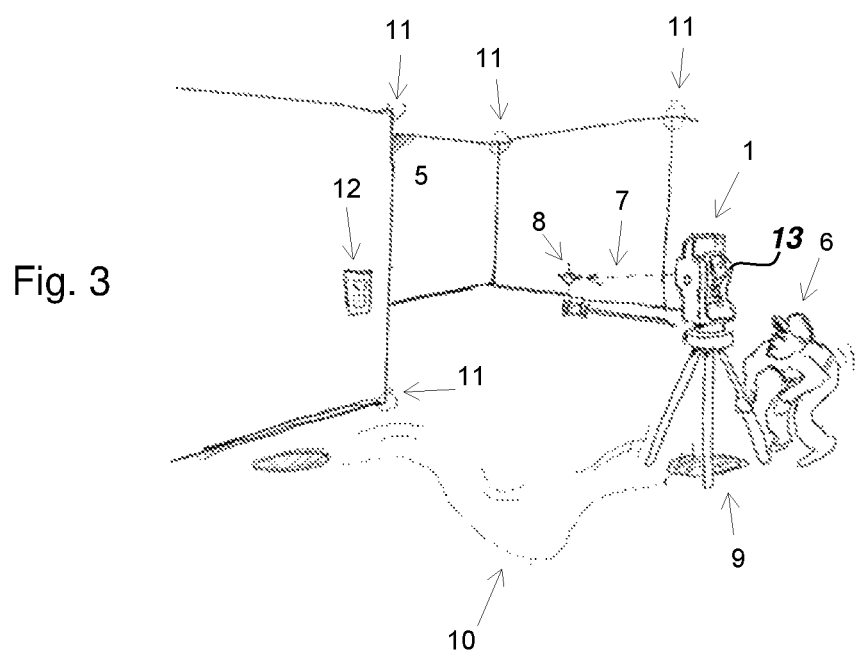
FIG. 3 shows the surveyor from FIGS. 1 and 2 performing a relocation using the total station configured according to the invention.
Figure 4:
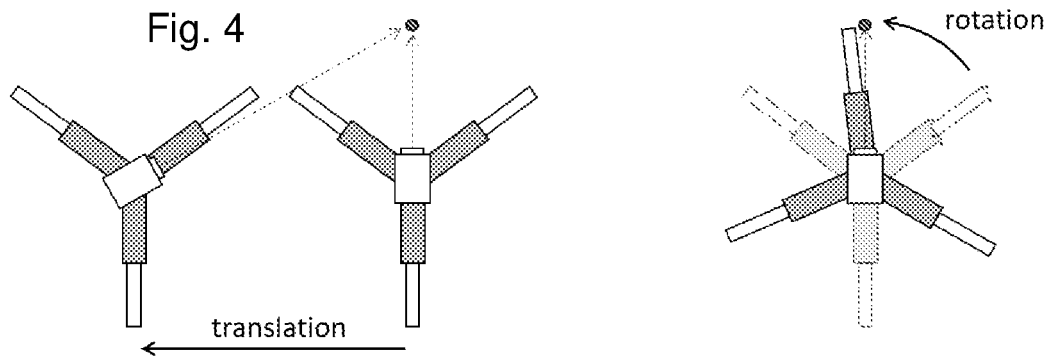
FIG. 4 shows translation of the surveying instrument and rotation of the support unit of the surveying instrument during relocation from a bird's eye view.

In the setting 4 shown in the FIGS. 1, 2, and 3, the surveyor 6 plans to survey a plurality of stationary target points. Since not all desired target points are accessible by the current setup location (see occluded area 5), the surveying instrument 1 should be relocated to a second setup location 9 from where the previously inaccessible points are then accessible. For this relocation process, the surveyor 6 is going to utilise one of the stationary target points, for example the marker 8 which is temporarily stuck onto the wall. In this example, the marker has reflecting properties so it can cooperate with the target search system by reflecting the characteristic target search light. However, the marker can also be non-reflective, i.e. it can be distinguished/detected by the contrasts of its clear features.

The invention takes advantage of the hardware of the tracking unit, in particular of the above mentioned target search system optionally comprised by the tracking unit, wherein a stationary target point is tracked while the surveying instrument is moved. For this, a relocation functionality can be activated on the control unit of the surveying instrument with a start signal, and deactivated with an end signal. Due to differently characterised kinematics, the controlling of the actuators which are moving the targeting unit 13 works with different parameters compared to the case where the surveying instrument is stationary while the target is moving. The relocation functionality makes sure that the tracking works smoothly and without interruption, for example by losing the stationary target point.

FIG. 2 shows the surveyor 6 guiding the measuring beam 7 with the pole 2 towards the marker 8 which shall serve as an anchor point (stationary target point), because it is presumably visible from both the initial setup location and the next setup location 9 which is necessary to be occupied in order to survey previously inaccessible points in certain areas 5 of the setting 4. For example, the surveying pole 2 or a remote controller has a functionality to stop or temporarily interrupt the "stationary" tracking in order to freeze the current alignment of the targeting unit 13. Once the surveyor 6 has removed the reflector 3 from the spot (this instant is shown in FIG. 2), the stationary tracking is switched to the relocation functionality, wherein the tracking unit is locking onto the marker 8. For this to happen, the surveying instrument 1 is provided with a start signal, which may happen in different ways. The surveyor 6 could manually input a start command in a user interface of the surveying instrument 1 or of a remote controller connected to the surveying instrument 1, which start command is then interpreted as the start signal. In another embodiment, the start signal could be generated by the surveying instrument by recognising a movement, e.g. by means of an inertial measuring unit (IMU) built into the surveying instrument.

FIG. 3 shows the total station 1 being placed at the second setup location 9, wherein the surveyor 6 travelled the trajectory 10 carrying the total station 1. While travelling the trajectory 10, the targeting unit 13 keeps aiming—at least roughly—at the marker 8. In a special case, the measuring beam 7 remains targeting the marker 8 all the time, but it is permissible that the marker 8 stays within the detection range of the tracking unit or a fraction thereof as long as the measuring axis 7 always trends towards the marker 8 and ends up directed at the marker 8 when the total station 1 arrives at the standstill at position 9.

For referencing the new setup location with regard to the initial setup location, the invention advantageously allows for an important first step to be already finished when the surveying instrument 1 is placed at the new setup location: the locating and determining of coordinates of the position of the marker 8, which was used as a stationary anchor point. The coordinates of this point from the perspective of the first setup location and the coordinates of this point from the perspective of the second setup location are automatically obtained and stored owing to the relocation functionality.

What follows is a sequential targeting of at least two further stationary points the position of which are known from the first setup location, e.g. because they have been measured before from there, or because they are known or derivable from known points. For example, the room corners 11 could be used for this purpose. In particular, once a second point is determined from the new setup location, the third one necessary to perform the whole relocating and referencing process could be estimated by the control unit of the surveying instrument 1 and offered to the user on a graphical user interface where he can decide if the targeting unit should be aimed automatically at one of these suggested locations. However, of course, the third stationary point could also be targeted and measured manually.

Once at least these two further stationary points are known by their coordinates from the second setup location, a reference is obtainable by the control unit between the first and second setup location. One advantage of the invention is that after relocating the surveying instrument, it is not necessary to choose and manually target a first stationary point based on which the first and second setup location shall be referenced. Also, the surveyor would need to let the control unit understand which of the points formerly measured from the first setup location it is that is now being measured from the second setup location. This correlation is done automatically and instantly with the inventive configuration.

In a further embodiment of the invention, the tracking unit of the surveying instrument can—in addition to or as an alternative to the target search system—also comprise a camera sensor. In an embodiment, the camera sensor is used to keep track of the first stationary target point, just as described with respect to the target search system above. In another embodiment, the camera sensor may—also or only-keep track of at least a second and third stationary target point in the neighbourhood of the first stationary target point tracked by the target search system.

A camera sensor can be (as was described for the target search sensor above) installed inside the tracking unit, in particular using the optical axis of a telescope (if applicable). The camera sensor may be on-axis with the measuring axis 7 of the distance meter. However, it could also be arranged off-axis, e.g. in or on the targeting unit, in or on the support unit, or in or on the base unit. One embodiment will be shown with FIG. 6 below. The camera sensor has a field of view (FOV) which in its dimensions is comprised by the detection range of the tracking unit (in an embodiment, the FOV of the camera sensor is the detection range).

It could be sufficient if the camera sensor tracks these at least two further stationary target points with a relatively rough accuracy because when the surveying instrument is finally setup at the second setup location 9, it will be enough for the tracking unit to only roughly know where to seek for the tracked further points. The tracking unit can then determine the accurate location of the second and third stationary target point as long as they are inside the detection range of the target search sensor.

In case the tracking unit only comprises the target search system, this automatic fine adjustment performed by the tracking unit may be problematic or not possible when the second and third stationary target points are not represented by a reflecting element, which will reflect the characteristic-wavelength light from the light emitter of the target search system. However, if the tracking unit comprises the camera sensor, the image-based tracking performed by the camera sensor while the surveying instrument is travelling from the first to the second setup location allows the targeting unit to already roughly aim at the tracked points in order to support the surveyor. Alternatively, the tracked points can be just marked on a live image displayed on a GUI, wherein the surveyor can use this as support to easier find the points, and/or tap the markings in the GUI whereupon the targeting unit could be automatically steered towards the marked point.

The tracked second and third target points can be chosen by the control unit automatically based on the scene available from the first setup location. Alternatively, the surveyor 6 can decide on his own which second and third stationary target points he want to be tracked, e.g. when he knows for sure that all three tracked points will be visible to the respective sensor during the travel from the first to the second setup location.

In yet another embodiment, the invention provides a surveying instrument with a tracking unit only comprising such a camera sensor (and no target search sensor with corresponding light emitter). In this case, the relocation process is performed only based on image data from the camera sensor. Consequently, the camera sensor of the tracking unit detects at least one, in particular at least three stationary points in the setting, e.g. three ceiling corners 11 as shown in FIG. 3, and keeps track of it/them during the travel of the surveying instrument 1.

In case only one, i.e. the currently targeted target point is tracked by the camera sensor, a second and third stationary target point must be searched and measured afterwards. It is convenient when the camera sensor tracks at least three points, wherein the measurement of the further two points can be automatic or semi-automatic.

Whether the camera sensor exists in the target unit additionally to the target search sensor, or solely, it is advantageous to keep track of at least two further stationary points other than the one being tracked along or neighbouring the measuring axis (first stationary target point) because it further reduces manual steps. In particular, one does not have to choose these further two points from the setting, such that the control unit understands where they have been from the perspective of the first setup location. The control unit, instead, can automatically choose points known (in particular previously measured) from the first setup location and track them off-axis and then (when arrived at the second setup location) automatically target them and measure their positions.

In an embodiment, the surveying instrument comprises an Inertial Measuring Unit (IMU) for keeping track of the movement between the two setup locations. For example, the IMU 14 is preferably located in the base unit as this part is not actuated relative to the support unit and the targeting unit. What happens during the relocation movement (between the start and end signal) is that the actuators move the targeting unit and the support unit such that the first stationary target point is always aimed at with the measuring axis. The respective angle encoders are recording these actuations, but which part of the actuations is attributable to a translation and which part to a rotation (see FIG. 5) remains unknown without further sensors. Therefore, with the provision of the IMU, the data recorded with the angle encoders can be compared with IMU recordings and translations distinguished from rotations.

Figure 5:
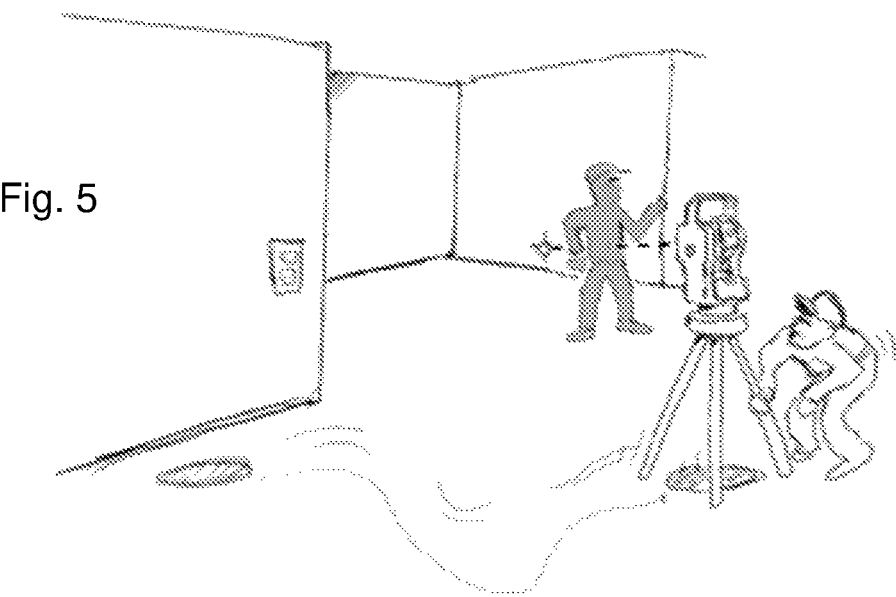
FIG. 5 shows a typical situation requiring a dead reckoning.

In particular, the provision of the IMU and the mentioned movement tracking allows for handling a so-called "dead reckoning" situation as FIG. 5 show. Should the line of sight between the tracking unit and the first stationary target point be crossed by an obstacle, the IMU can bridge the blind moment, in which the tracking sensor does not detect the first stationary target point, and continuously provide the control unit with an estimation about where the first stationary target point is located until the line of sight is re-established.

In another embodiment, alternatively or additionally to the IMU, a visual inertial module is provided which comprises at least one wide-angle or fish-eye camera that observes the environment 5. The camera(s) of the visual inertial module can be arranged in the support unit and/or in the targeting unit and/or in the base unit. The visual inertial module can track at least one, in particular several (random) feature(s) of the environment in order to record positions and orientations of the surveying instrument during the relocation. In particular, the poses are rendered essentially based on a comparison of pictures captured from the different perspectives. In a special functionality, this can be implemented continuously to establish a Simultaneous Localisation and Mapping (SLAM) process that can support the relocation functionality according to the invention (just like the IMU tracking). That is, from one aspect, the IMU and/or the visual inertial module is/are enhancing the tracking during the relocation, and from another aspect, it/they are enhancing the determination of the relative pose between the first and second setup location of the surveying instrument. The camera sensor mentioned above as part of the tracking unit can also have the same function as the visual inertial module.

FIG. 6 shows components of the surveying instrument 1 comprising a base unit 21, a support unit 22 mounted on the base unit 21 and configured for being rotatable relative to the base unit 21 around a yaw axis, a first actuator 23 configured for rotating the support unit 22 relative to the base unit 21 around the yaw axis, a first angle encoder 24 configured for measuring a rotatory position of the support unit 22 relative to the base unit 21 around the yaw axis, a targeting unit 13 comprising a distance meter 25 having a measuring axis, the targeting unit 13 being mounted on the support unit 22 and configured for being rotatable relative to the support unit 22 around a pitch axis, a second actuator 26 configured for rotating the targeting unit 13 relative to the support unit 22 around the pitch axis, a second angle encoder 27 configured for measuring a rotatory position of the targeting unit 13 relative to the support unit 22 around the pitch axis, a tracking unit 28 configured for detecting one or more target points within a detection range, wherein the measuring axis converges with or extends entirely within the detection range, a control unit 29 configured for reading the distance meter 25, the first angle encoder 24, the second angle encoder 27, and the tracking unit 28, controlling the first actuator 23 and the second actuator 26, and executing a relocation functionality.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A geodetic surveying instrument embodied as total station, comprising:
  a base unit,
  a support unit mounted on the base unit and configured for being rotatable relative to the base unit around a yaw axis,
  a first actuator configured for rotating the support unit relative to the base unit around the yaw axis,
  a first angle encoder configured for measuring a rotatory position of the support unit relative to the base unit around the yaw axis,
  a targeting unit comprising a distance meter having a measuring axis, the targeting unit being mounted on the support unit and configured for being rotatable relative to the support unit around a pitch axis,
  a second actuator configured for rotating the targeting unit relative to the support unit around the pitch axis,
  a second angle encoder configured for measuring a rotatory position of the targeting unit relative to the support unit around the pitch axis, and
  a tracking unit comprising a camera sensor and being configured for detecting one or more target points within a detection range,
  a control unit configured for:
  reading the distance meter, the first angle encoder, the second angle encoder, and the tracking unit,
  controlling the first actuator and the second actuator, and
  executing a relocation functionality, wherein the surveying instrument is, when the relocation functionality is executed, configured for:

detecting at least three stationary points in the environment and keeping track of them during travel of the surveying instrument from a first setup location to a second setup location, based on image data from the camera sensor, and when arrived at the second setup location:

choosing at least two known target points by the control unit automatically based on the scene available from the first setup location and based on the step of keeping track of the at least three stationary points, measuring the positions of the at least two known target points automatically or semi-automatically, wherein coordinates of the at least two known target points are determined based on readings of the distance meter, the first angle encoder and the second angle encoder, and based at least in part on the determined coordinates of the at least two known target points, determining a relative pose of the surveying instrument in the second setup location with respect to the first setup location.

2. The surveying instrument according to claim 1, further comprising an inertial measuring unit (IMU) configured for generating IMU data between receiving a start signal and an end signal, wherein the control unit is configured for distinguishing between a translation and a rotation of the surveying instrument based on the IMU data.

3. The surveying instrument according to claim 1, wherein the at least two known target points are previously measured from the first setup location, wherein coordinates of the at least two known target points are determined based on readings of the distance meter, the first angle encoder and the second angle encoder.

4. The surveying instrument according to claim 3, further comprising an inertial measuring unit (IMU) configured for generating IMU data between receiving a start signal and an end signal, wherein the control unit is configured for distinguishing between a translation and a rotation of the surveying instrument based on the IMU data.

5. The surveying instrument according to claim 1, the control unit being configured for executing the relocation functionality such that:

a start signal is received indicative for the surveying instrument being in the first setup location and being about to be moved from the first setup location to a second setup location, and an end signal is received indicative for the surveying instrument having arrived at the second setup location.

6. The surveying instrument according to claim 5, further comprising an inertial measuring unit (IMU) configured for generating IMU data between receiving the start signal and the end signal, wherein the control unit is configured for distinguishing between a translation and a rotation of the surveying instrument based on the IMU data.

7. The surveying instrument according to claim 5, further comprising at least one of:

a user interface configured for receiving a user input, wherein at least one of the start signal and the end signal is/are based on a respective user input received by the user interface, and an inertial measuring unit (IMU) configured for detecting a standstill and a movement of the surveying instrument, wherein the control unit is configured for reading the IMU and for generating the start signal based on a detected movement and/or the end signal based on a detected standstill.

8. The surveying instrument according to claim 7, further comprising an inertial measuring unit (IMU) configured for generating IMU data between receiving the start signal and the end signal, wherein the control unit is configured for distinguishing between a translation and a rotation of the surveying instrument based on the IMU data.

9. The surveying instrument according to claim 1, wherein the tracking unit is configured for detecting random features of the environment as the at least three stationary points, and wherein the control unit is configured for performing a Simultaneous Localisation and Mapping (SLAM) process based on detected random features of the environment.

10. The surveying instrument according to claim 1, wherein the tracking unit comprises:

a light emitter configured for emitting light with a characteristic wavelength, and a target search sensor configured for detecting only light having the characteristic wavelength, the target search sensor having a second field of view, the second field of view being comprised by the detection range.

11. The surveying instrument according to claim 10, wherein the at least two known target points are previously measured from the first setup location, wherein coordinates of the at least two known target points are determined based on readings of the distance meter, the first angle encoder and the second angle encoder.

12. The surveying instrument according to claim 10, the control unit being configured for executing the relocation functionality such that:

a start signal is received indicative for the surveying instrument being in the first setup location and being about to be moved from the first setup location to a second setup location, and an end signal is received indicative for the surveying instrument having arrived at the second setup location.

13. The surveying instrument according to claim 10, further comprising at least one of:

a user interface configured for receiving a user input, wherein at least one of the start signal and the end signal is/are based on a respective user input received by the user interface, and an inertial measuring unit (IMU) configured for detecting a standstill and a movement of the surveying instrument, wherein the control unit is configured for reading the IMU and for generating a start signal based on a detected movement and/or an end signal based on a detected standstill.

14. The surveying instrument according to claim 10, further comprising an inertial measuring unit (IMU) configured for generating IMU data between receiving a start signal and an end signal, wherein the control unit is configured for distinguishing between a translation and a rotation of the surveying instrument based on the IMU data.

15. The surveying instrument according to claim 10, wherein the tracking unit is configured for detecting random features of the environment as the at least three stationary points, and wherein the control unit is configured for performing a Simultaneous Localisation and Mapping (SLAM) process based on detected random features of the environment.

* * * * *